Nov. 17, 1964   R. J. SEVALD   3,157,351
BEARING ASSEMBLY
Filed Oct. 19, 1961
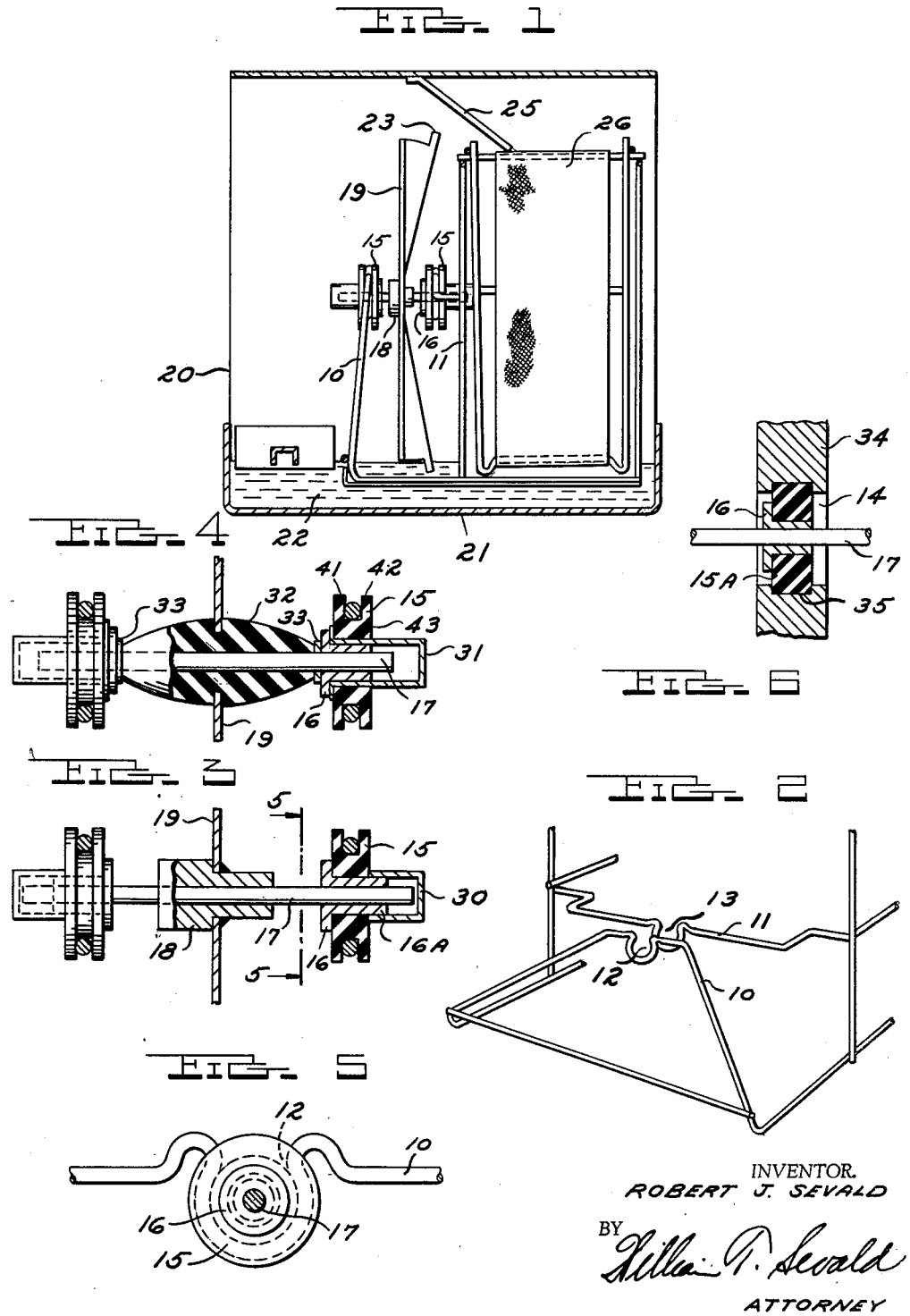
INVENTOR.
ROBERT J. SEVALD
BY
ATTORNEY 3,157,351
BEARING ASSEMBLY
Robert J. Sevald, Royal Oak, Mich., assignor to
William T. Sevald, Royal Oak, Mich.
Filed Oct. 19, 1961, Ser. No. 146,220
6 Claims. (Cl. 230—232)

This invention relates to a lubricated and resiliently supported, self-aligning, and dynamically balancing bearing assembly.

Bearings, axles, rotationally supported loads, and lubrication means have been employed heretofore to facilitate the rotation of a load such as a windmill type fan, however, the several devices of the prior art have not proven entirely satisfactory inasmuch as they are complicated in design and construction, expensive to manufacture, difficult to assemble, align, and balance; unsatisfactory in use, and difficult to repair.

With the foregoing in view, the primary object of the invention is to provide a bearing assembly which is simple in design and construction, inexpensive to manufacture, easy to use, easy to assemble, and which is adapted for easy repair and replacement.

An object of the invention is to provide a resilient support member for the bearing, axle, and load such as a rubber grommet.

An object of the invention is to provide a floatingly supported self aligning axle and bearing assembly which not only has floating means providing a dynamic center of balance during rotation but which also absorbs the shocks relative to the load imposed on the axle and bearing.

An object of the invention is to provide resilient floatingly supporting means for the axle and bearing and load which is particularly suitable for a windmill type fan having water contacting tips involving water impact shock loads on the tips of the fan which contact the water to throw same upwardly on the evaporator members.

An object of the invention is to provide novel support members such as arcuately bent wire sockets for supporting the resilient member such as a rubber grommet wherein the resilient member is locked in the socket by the insertion of the bearing and/or lubricant holding tubular member.

An object of the invention is to provide a fan assembly which can be easily removed and replaced and/or any part removed and replaced very efficiently as the various parts are easily separable for disassembly and removal due to the fact that while they are inter-locked mechanically they are without fixed attachment such as welding, bolts, or rivets.

These and other objects of the invention will become apparent by reference to the following description of a bearing assembly embodying the invention taken in connection with the accompanying drawing in which:

FIG. 1 is a cross-sectional view of a humidifier housing showing the windmill fan, bearing assembly, and evaporator rack assembly in elevation.

FIG. 2 is a perspective view of a portion of the rack assembly showing the arcuate wire socket.

FIG. 3 is an enlarged partial cross-sectional of the bearing assembly and fan hub area of FIG. 1 showing the construction in more detail.

FIG. 4 is a view similar to FIG. 3 showing a modification in construction.

FIG. 5 is a cross-sectional view of FIG. 3 taken on the line 5—5 thereof showing the resilient member socket and bearing integration in face elevation; and FIG. 6 is a cross-sectional view of bearing socket and mounting modification.

Referring now to the drawing wherein like numerals refer to like and corresponding parts throughout the several views, the bearing assembly disclosed therein to illustrate the invention comprises paired support members 10 and 11 having paired sockets 12 and 13 which may be arcuately formed wire members as seen in FIG. 2 or a completely annular socket 14 as seen in FIG. 6 with the resilient members 15 and 15a disposed in the sockets and the bearings 16 disposed in the resilient members 15 via an axial aperture in the resilient members. The bearings 16 house the axle 17 which in turn supports the hub 18 and windmill fan 19 thereon.

More particularly, and for the purpose of describing a specific and particular use of the inventive bearing assembly, the humidifier housing 20 has a water pan 21 containing water 22 which is contacted by the tips 23 on the fan 19 as the fan rotates and in this particular instance the fan 19 is driven by a current of air flowing through the humidifier housing 20 so as the fan 19 turns rapidly, the tips 23 are engaging the water 22 so as to throw same upwardly on the top plate 25 from whence it drains down on the evaporator strips 26 through which the air stream travels to pick up moisture therefrom and it will be understood that upon the tips 23 contacting the water, a shock load is imposed on the fan 19 and bearing assembly which tends to throw same out of balance and to induce blows on the bearing assembly via the shocks received on the axle 17.

In assembling the device seen in FIGS. 1, 3, and 5, the resilient members 15, such as the rubber grommet shown, are first forced into the sockets 12 and 13 by deforming the grommets via their central axial aperture and their resilient characteristics so that the flanges 41 and 42 lie on either side of the support member and so that their core 43 surrounds the bearing 16. The bearing 16 is then forced in the grommet central aperture which locks the grommet in the socket irremovably until the bearing 16 is again removed. The bearing may be provided with an extending portion 16a as seen in FIG. 3 upon which the tubular lubricant holding casing 30 is annexed. The fan 19, hub 18 are fixed on the axle 17 and the user then inserts one end of the axle 17 in one of the bearings 16 and then spreads the support members 10 and 11 springwise so as to permit the other end of the axle 17 being inserted in the opposite bearing assembly and upon release of the support members they spring back to their original condition such as seen in FIG. 3, however, it is to be understood that the tubular casing 30 can also be attached later in this instance of FIG. 3 so that the axle 17 can project through the bearings to allow assembly without springing the support members 10 and 11.

Referring to the device seen in FIG. 4 the grommet 15 is first inserted in the support member and the tubular casing 31 is then inserted in the grommet blocking the grommet in the support member and then the bearing 16 is inserted in the tubular casing 31. The fan 19 is inserted in the groove of the resilient hub 32 and the axle 17 inserted in the hub 32 locking the hub 32 and fan 19 together. The washers 33 are placed on the axle at either end of the hub 32 and the ends of axle 17 inserted in the bearings 16 and it is to be understood that the tubular casings 30 and 31 are first filled with lubricant prior to the insertion of the axle 17 and the bearings 16.

Referring to FIG. 6, the support member 34 has a circumferential socket 14 into which is inserted the resilient member 15a whereupon inserting the bearing 16, the resilient member is locked in the support member aperture as it is counter-bored to provide a receiving socket 35 for the resilient member 15a.

In the use of double bearing assembly supporting either end of an axle, the alignment of the bearings is usually a precise and difficult job, however, in the instant device as seen in FIGS. 1 through 4, the mounting permits the axle and bearings via the resilient grommets to self align themselves regardless of any irregularities in the alignment of the socket. Also balancing a fan statically and dynamically is exceedingly difficult, however, with the resilient support at the bearings the fan may establish a dynamic center of balance during rotation and thereby run truly due to the fact that the resilient support members 15 permit the floating movement of the bearings and the axle. It is to be further understood that in the resilient hub member 32 that the fan 19 can also dynamically balance itself via the floating resiliency of the hub 32 itself.

Due to the fact that the fan 19 is air powered, it must of necessity initiate rotation with substantially no torque and therefore the bearings 16 must be substantially free of resistance however, they must be relatively strong and tight due to the fact that the fan 19 operates under unbalance due to the fact that the tips 23 keep striking the water 22 thereby shockwise causing vibrations in the fan and bearing assembly which are completely damped and compensated by the resiliency of the bearing mountings and/or the resiliency of the fan mounting on the hub.

The inventive device with the features described constitutes a compact, durable, neat appearing, well lubricated, dynamically balanced, and shock resistant bearing assembly which is easily assembled, repaired, and replaced and which presents an attractive appearance and an efficient long life operation very inexpensively compared to accurately machined and aligned bearings which could only possibly provide a static balance whereas in the instant device not only is the alignment insured and shocks absorbed but also a dynamic balance facilitated.

Although but a single embodiment of the invention has been shown and described in detail with two modifications it is obvious that many changes may be made in size, shape, detail and arrangements of the various elements of the invention within the scope of the appended claims.

I claim:

1. A fan assembly particularly suitable for a humidifier comprising paired spaced supports having opposite sides; said supports having axially aligned apertures; paired resilient grommets disposed in said support apertures; each said grommet having a core portion lying within said support apertures and each said grommet having flanges radially extending from said core overlying the opposite sides of each said support positioning said grommets on said supports; said cores having axial apertures; said resilient grommets being insertable in said support apertures via deformation permitted by their resilient characteristics and their core aperture; a tubular lubricant holding casing having a closed end and an open end disposed in each said grommet aperture so as to assist in locking each said grommet in each said support aperture, an apertured bearing disposed in each said tubular casing open end, an axle having opposite ends rotatably disposed in said apertured bearings and an intermediate portion spanning the space between said bearings; said casing storing and feeding lubricant to said bearings and axle and fan disposed on said axle intermediate portion; said resilient grommets yielding to permit said axle to self align said bearings relative to said axle, cushioning said bearing relative to fan rotational load on said axle and bearings, and permitting said bearings to floatingly move to dynamically balance said fan and axle during loaded rotation.

2. In a device as set forth in claim 1, a second resilient member disposed on said axle intermediate portion between said axle and said fan cushionwise floatingly supporting said fan on said axle.

3. A fan assembly particularly suitable for a humidifier comprising, paired spaced supports having sockets, paired resilient members disposed in said support sockets; each said member having an axial aperture, a tubular lubricant holding casing having a closed end and an open end disposed in each said member aperture, an apertured bearing disposed in said open end of each said tubular casing, an axle having opposite ends rotatably disposed in said apertured bearings and an intermediate portion spanning the space between said bearings; said casing storing and feeding lubricant to said bearings and axle; and a windmill fan disposed on said axle intermediate portion; said resilient members yielding to permit said axle to self align said bearings relative to said axle, cushioning said bearing relative to fan rotational load on said axle and bearings, and permitting said bearings to floatingly move to dynamically balance said fan and axle during rotation.

4. In a device as set forth in claim 3, a second resilient member on said axle intermediate portion between said axle and said fan floatingly supporting said fan on said axle.

5. A fan assembly particularly suitable for a humidifier comprising, paired spaced supports having sockets, paired resilient members disposed in said support sockets; each said resilient member having an axial aperture; an apertured bearing disposed in each said resilient member aperture, each said bearing having an end projecting outside said resilient member; a tubular casing on said projecting end of each said bearing for containing and feeding lubricant to each said separate bearing aperture, an axle having an end rotatably disposed in each said bearing aperture and a portion extending outwardly of each said separate bearing for supporting a load; a load imposed on said axle extending portion, said resilient member yielding to permit said axle to self align each said separate bearing and said axle relative to one another; to cushion each said bearing relative to said load on said axle and bearings; and to permit each said separate bearing to floatingly move to dynamically balance said load and axle during rotation.

6. In a device as set forth in claim 5, a second resilient member on said axle extending portion between said axle and said load imposed thereon cushionwise floatingly supporting said load on said axle.

References Cited in the file of this patent

UNITED STATES PATENTS

| | | |
|---|---|---|
| 2,509,376 | Trask | May 30, 1950 |
| 2,600,325 | Reisch | June 10, 1952 |
| 2,885,142 | Eberhart | May 5, 1959 |
| 2,923,460 | Galaba | Feb. 2, 1960 |
| 2,957,665 | Feiertag et al. | Oct. 25, 1960 |

FOREIGN PATENTS

| | | |
|---|---|---|
| 63,473 | Norway | Apr. 23, 1941 |